United States Patent
Cheung

(10) Patent No.: US 6,671,261 B1
(45) Date of Patent: Dec. 30, 2003

(54) METHOD FOR MEASURING TRANSMISSION DELAY

(75) Inventor: Hay Yeung Cheung, Holmdel, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/461,933

(22) Filed: Dec. 15, 1999

(51) Int. Cl.[7] .............................................. H04L 12/66
(52) U.S. Cl. ...................................... 370/252; 370/352
(58) Field of Search ................................ 370/352, 353, 370/354, 355, 356, 503, 519, 252

(56) References Cited

U.S. PATENT DOCUMENTS

| | | | |
|---|---|---|---|
| 4,562,573 A | * 12/1985 | Murano et al. ............. | 370/508 |
| 5,878,032 A | * 3/1999 | Mirek et al. ................ | 370/252 |
| 5,883,891 A | 3/1999 | Williams et al. | |
| 5,889,774 A | 3/1999 | Mirashrafi et al. | |
| 6,055,247 A | * 4/2000 | Kubota et al. ............. | 370/508 |
| 6,112,236 A | * 8/2000 | Dollin et al. ............... | 709/224 |
| 6,259,691 B1 | * 7/2001 | Naudus ...................... | 370/352 |
| 6,363,065 B1 | * 3/2002 | Thornton et al. ........... | 370/352 |
| 6,445,681 B1 | * 9/2002 | Pogrebinsky ............... | 370/252 |
| 6,466,548 B1 | * 10/2002 | Fitzgerald .................. | 370/249 |
| 6,512,761 B1 | * 1/2003 | Schuster et al. ............ | 370/352 |
| 6,584,110 B1 | * 6/2003 | Mizuta et al. .............. | 370/401 |

FOREIGN PATENT DOCUMENTS

| | | | |
|---|---|---|---|
| EP | 1035719 A2 | * 9/2000 | ............ H04M/7/00 |
| JP | 2000209282 A | * 7/2000 | ............ H04L/12/66 |

OTHER PUBLICATIONS

Internet integrated service over ATM: a solution for shortcut QoS virtual channels; Cocca, R.; Salsano, S.; Listanti, M.; IEEE Communications Magazine, vol. 37 Issue: 12, Dec. 1999 page(s): 98–104.*

A framework for testing IP QoS over ATM networks: implementation and practical experiences; Kroth, N.; Mark, L.; Tiemann, J.; ATM, 1999. ICATM '99. 1999 2nd International Conference on, 1999 page(s): 212–219.*

Delay performance analysis of the new Internet services with guaranteed QoS; van der Wal, K.; Mandjes, M.; Bastiaansen, H.; Proceedings of the IEEE, vol.: 85 Issue: 12, Dec. 1997 page(s): 1947–1957.*

Delay performance of the new Internet service with guaranteed QoS compared to ATM; Van Der Wal, K.; Mandjes, M.; Bastiaansen, H.; IEEE ATM Workshop 1997. Proceedings, May 25–28, 1997 page(s): 90–99.*

* cited by examiner

*Primary Examiner*—Chau Nguyen
*Assistant Examiner*—Jasper Kwoh

(57) ABSTRACT

An apparatus and method of establishing a communication connection is provided. A one-way delay is not approximated by an average of a two-way delay calculation. Instead, a first time difference is determined based on a round-trip delay of a transmission over a packetized network and a circuit-switched network. A second time difference is also determined based on a round-trip delay of a transmission over the circuit-switched network. Then a delay value is calculated based on the two time differences.

8 Claims, 2 Drawing Sheets

METHOD FOR MEASURING TRANSMISSION DELAY

BACKGROUND OF THE INVENTION

1. Field of Invention

The present invention is directed to a method and apparatus measuring transmission delay.

2. Description of Related Art

Presently, Internet Protocol (IP) services are being used to transmit data in real time. Such data may include audio data, video data, time critical service data and other forms of real time data. For example, two parties may wish to transmit two-way speech over the Internet. Because data transmitted over the Internet may be subject to delays and losses, these delays and losses may result in unintelligible speech transmissions. Designers of software and hardware that are utilized for speech transmission must take into consideration such delays and losses. Unfortunately, tools used to model delays may not provide accurate results.

Existing programs may be used to calculate the approximate Internet round-trip delay. To attempt to approximate a one-way delay, the user such a program must manually divide the round trip delay in half. This may lead to inaccurate and variable results because a return path of an Internet connection may be very different from the forward path.

Systems, such as Global Positioning Systems (GPS), may also be used to approximate Internet delay. The GPS may be used to synchronize two computers, send a data packet in one direction and measure the time it takes to send and receive the data packet. Unfortunately, the use of GPS to approximate Internet delay is expensive, complicated and inconvenient.

SUMMARY OF THE INVENTION

The invention provides an apparatus and method of measuring delay over a packetized network from a first terminal to a second terminal. A one-way delay is not approximated by an average of a two-way delay calculation, as in prior art. Also, less variation is introduced in the measurement of the delay by the use of a circuit switch network which utilizes fixed timeslots. In accordance with the invention, a first time difference is determined based on a round-trip delay over a combination of a packetized network and a circuit switched network. A second time difference is determined based on a round trip delay over the circuit switched network. Then a delay value is calculated by subtracting half of the second time difference from the first time difference.

The method may further include the sending of a first data transmission from the first terminal to the second terminal over the packetized network. The first data transmission is returned from the second terminal to the first terminal over a circuit switched network. A first time difference is determined between sending and receiving the first data transmission at the first terminal. A second data transmission is sent from the first terminal to the second terminal over the circuit switched network. A second time difference is determined between sending and receiving the second data transmission at the first terminal. A delay value is then calculated by subtracting half of the second time difference from the first time difference.

The packetized network may include an Internet system and the circuit switched network may include a Plain Old Telephone Service (POTS) network. The first data transmission may include a voice over Internet protocol data transmission and the second data transmission may include a voice over Internet protocol data transmission. The step of determining the first time difference may include setting a first time of transmission, determining a first time of reception, and calculating a difference between the first time of transmission and the first time of reception. The step of determining a second time difference may include setting a second time of transmission, determining a second time of reception, and calculating the difference between the second time of transmission and the second time of reception. The first data and second data transmission may include a generated tone. The data transmitted over the packetized network may include any form of signal and the data transmitted over the circuit switched network may include any form of signal or may include a generated tone.

BRIEF DESCRIPTION OF THE DRAWINGS

The preferred embodiments of the present invention will be described with reference to the following figures, wherein like numerals designate like elements, and wherein.

DETAILED DESCRIPTION OF PREFERRED EMBODIMENTS

Figure 1:
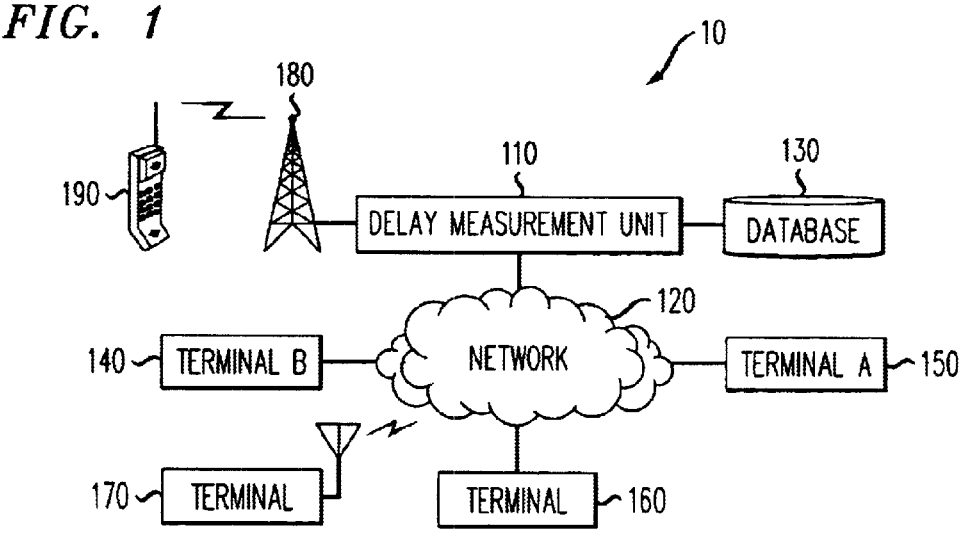
FIG. 1 is an exemplary block diagram of a system according to a first embodiment.

FIG. 1 is an exemplary block diagram of a system 10 according to one embodiment of the invention. The system 10 includes a delay measurement unit 110, a network 120, a database 130 and one or more terminals 140, 150, 160, 170 and 190. Terminals 140, 150, 160, 170 and 190 may include telephones, wireless telephones, cellular telephones, PDAs, computer terminals, pagers, fax machines, answering machines or any other device that is capable of sending and receiving data.

In an exemplary embodiment, the delay measurement unit 110 is connected to the network 120, which may include any type of network that is capable of sending and receiving communication signals. For example, the network 120 may include a packetized data network, such as the Internet, an Intranet, a local area network (LAN), a wide area network (WAN), and other like communication systems. The network 120 may also include a telecommunications network, such as a local telephone network, long distance telephone network, a plain old telephone service (POTS) network, a public switched telephone network (PSTN), cellular telephone network, satellite communications network, and other like communications systems. Furthermore, the network 120 may include more than one network and may include a plurality of different types of networks. Thus, the network 120 may include a plurality of data networks, a plurality of telecommunications networks, a combination of data and telecommunications networks and other like communication systems.

In another embodiment, the delay measurement unit 110 may also be connected to an independent communication system 180, such as a cellular communication system, a satellite communications network, or other like communications systems. The communication system 180 may communicate with a wireless terminal 190.

A designer may use a terminal 140 to access the delay measurement unit 110 or the delay measurement unit 110 may be present on the terminals. The delay measurement unit 110 may retrieve information from the database 130 corresponding to network 120, the terminal 140, the designer, or other relevant information. The database 130 does not have to be separate from the delay measurement unit 110 and may be integrated into the delay measurement unit 110. The delay measurement unit 110 may contain all relative information for a terminal 140 and the network 120 and the delay measurement unit 110 may communicate with other delay measurement units to obtain relative information for the terminals and the network 120.

Additionally, the delay measurement unit 110 may be used with an integrated measurement system. The integrated measurement system may have the ability to send, receive and store various types of information. For example, the measurement system may compile a database containing delay measurements, network information, information about the terminals, and other types of information useful for measuring delays across a network.

In operation, for example, a terminal 150 may send a transmission across a first portion of the network 120 (e.g., a packetized portion) to another terminal 140. The terminal 140 may immediately return the transmission back to the terminal 150 across a second portion of the network 120, such as a circuit-switched portion. The delay measurement unit 110 may then make a first determination of the time that it took to send the transmission across the packetized portion of network 120 and to receive the transmission at the terminal 150. The terminal 150 may then send another transmission across the circuit-switched portion of network 120 to the terminal 140. The terminal 140 may immediately return the transmission back to the terminal 150 across the circuit-switched network 120. The delay measurement unit 110 may then make a second determination of the time that it took to send and receive the transmission at the terminal 150. The delay measurement unit 110 may then calculate a delay value for the circuit-switched portion of the network 120 based on the two time differences. This delay value may be calculated by subtracting half of the value of one of the determinations of time from the value of the other determination of time.

Figure 2:
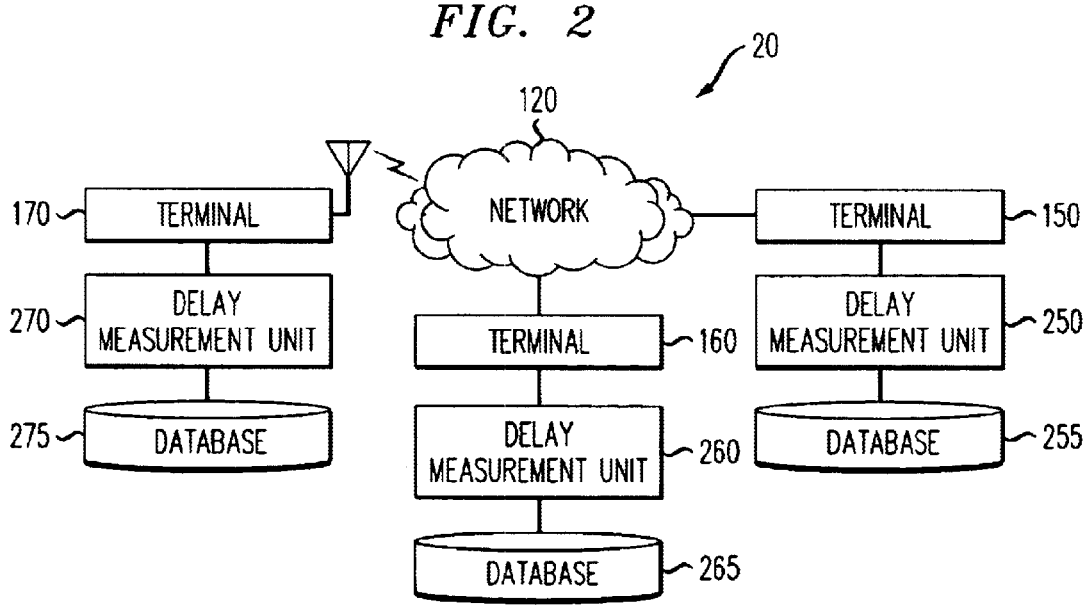
FIG. 2 is an exemplary block diagram of a system according to a second embodiment.

FIG. 2 is an exemplary block diagram of a system 20 according to another embodiment of the invention. The system 20 may include a network 120, one or more terminals 150, 160 and 170, one or more delay measurement units 250, 260 and 270 and one or more databases 255, 265 and 275.

The elements of system 20 comprise elements similar to the corresponding elements found in the system 10. System 20 illustrates local delay measurement units 250, 260 and 270 that are autonomous. The delay measurement units 250, 260 and 270 may include individual databases 255, 265 and 275 respectively. The systems 10 and 20 are not limited to the global and local delay measurement units 110, 250, 260 and 270. The systems 10 and 20 may include combinations of local, semi-global and global delay measurement units that provide for various degrees of communication. For example, the delay measurement unit 250 may be able to forward information to the delay measurement unit 260.

For further illustration, reference will be made to the delay measurement unit 110, but it is understood that references to the delay measurement unit 110 are interchangeable with references to the local delay measurement units 250, 260 and 270 and other scales of delay measurement units. Additionally, it is understood that various features of FIG. 1 may be combined with various features of FIG. 2 to effectuate various combinations of communication systems and measurement systems.

Figure 3:
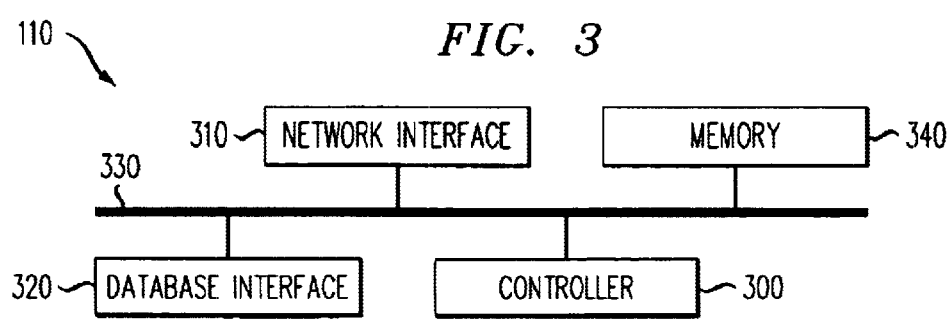
FIG. 3 is an exemplary block diagram of the delay measurement unit of FIG. 1.

FIG. 3 is an exemplary block diagram of the delay measurement unit 110. The delay measurement unit 110 may include a controller 300, a memory 340, a network interface 310, a database interface 320 and a bus 330. The controller 300 controls the operation of the delay measurement unit 110 and communicates with the network 120 and the terminals 140, 150 and 160 through the network interface 310 and communicates with the database 130 via the databases interface 320.

When a designer uses terminal 140, for example, to access the delay measurement unit 110, the communication signals are routed by the network 120 to the delay measurement unit 110. The controller 300, through the network interface 310, initiates gathering of network and terminal information. The network and terminal information may be gathered from information located in data sent across the network 120.

Information may be input by the designer into the terminal 140 by any of the various methods well known in the art. For example, the designer may use a keypad or keyboard to enter information to the controller 300. Another example would be the use of voice recognition by the controller 300 to decipher and enter spoken network and terminal information.

Once the controller 300 receives an access request from a designer, the controller 300 may send a menu to the designer's terminal 140. The menu may include options for establishing a connection, setting delay information or any other options useful for establishing a connection and measuring a delay across a network. The menu may be presented to the designer in an audio or visual manner or any other manner useful for presenting a menu.

The controller 300 waits to receive a selection from the designer. The selection may be input through various ways, such as keypad, voice recognition, of the like. Once the selection is received by the controller 300, the controller 300 acts based on the selected menu item, such as to attempt to establish a communication connection.

In an exemplary embodiment, the controller 300 operates in accordance with the invention by determining a first time difference based on a round-trip delay over a combination of a packetized network portion and a circuit-switched network portion, determining a second time difference based on a round-trip delay over the circuit-switched network portion and calculating a delay value by subtracting half of the second time difference from the first time difference.

The controller 300 may further send a first data transmission from a first terminal 150 to a second terminal 140 over the packetized portion of the network 120, return the first data transmission from the second terminal 140 to the first terminal 150 over the circuit-switched portion of the network 120, determine a first time difference between sending and receiving the first data transmission at the first terminal 150, send a second data transmission from the first terminal 150 to the second terminal 140 over the circuit-switched portion of the network 120, return the second data transmission from the second terminal 140 to the first terminal 150 over the circuit-switched portion of the network 120, determine a second time difference between sending and receiving the second data transmission at the first terminal 150 and calculate a delay value by subtracting half of the second time difference from the first time difference.

The packetized portion of the network 120 may include an Internet system and the circuit-switched portion of the network 120 may include a plain old telephone service (POTS) network. The first data transmission may include a voice over Internet protocol data transmission and the second data transmission may include a voice over Internet protocol data transmission. The controller 300 may determine the first time difference by setting a first time of transmission, determining a first time of reception, and calculating a difference between the first time of transmission and the first time of reception. The controller 300 may determine the second time difference by setting a second time of transmission, determining a second time of reception, and calculating the difference between the second time of transmission and the second time of reception. The first and second data transmissions may include any signal such as a generated tone, a multimedia transmission, or any other signal or data that may be used as a transmission. Furthermore, the data transmitted over the packetized network may include any form of data signal and the data transmitted over the circuit switched network may include any form of data signal or may include a generated tone.

The database interface 320 provides access to the database 130 through which information may pass from the database 130 to the controller 300. Similarly, the network interface 310 provides access to the network 120. Information may pass between the controller 300 and the terminals 140, 150 and 160 via the network 120 through the network interface 310. In this exemplary block diagram, the network 120 may comprise only the local bus 330, or it may comprise a more elaborate system such as a LAN, WAN or other communication network.

Figure 4:
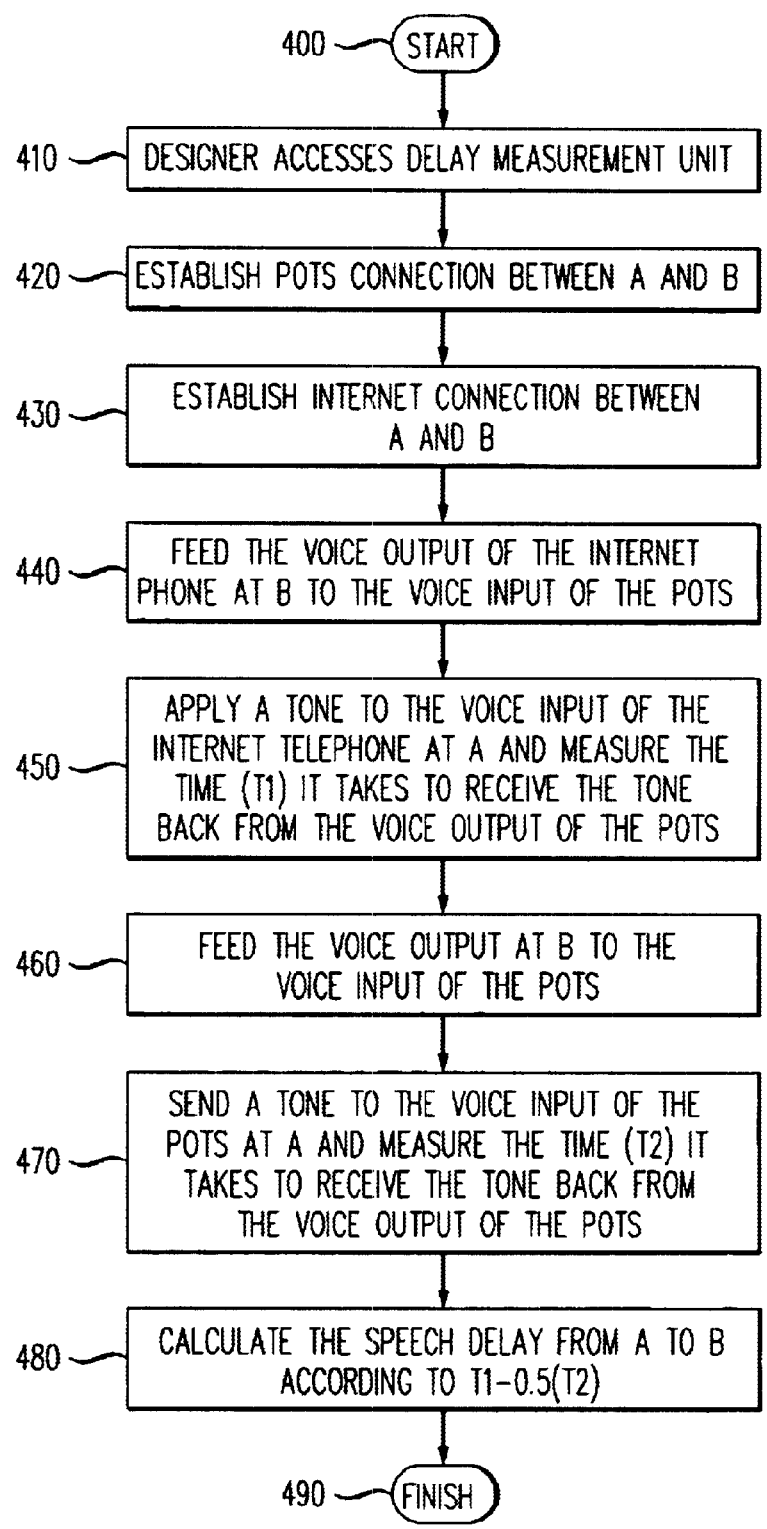
FIG. 4 is an exemplary flowchart outlining the operation of the delay measurement unit of FIG. 1.

FIG. 4 is an exemplary flowchart outlining the operation of the delay measurement unit of FIG. 1. Initiation of the process begins in step 400. In step 410, a designer may access the delay measurement unit 110. In step 420, the delay measurement unit 110 establishes a POTS connection between terminal A 150 and terminal B 140. In step 430, the delay measurement unit 110 establishes an Internet connection between terminal A 150 and terminal B 140.

This Internet connection may be made by using an Internet phone service or software or any other system useful for establishing an Internet connection between two terminals. Such Internet phone software may include inputs and outputs at each terminal. Additionally, the POTS connection may be made by using a modem or any other system useful for establishing a connection between two terminals over a phone line. Such a POTS connection may include inputs and outputs at each terminal.

In step 440, the delay measurement unit feeds the voice output of the Internet phone at terminal B 140 to the voice input of the POTS at terminal B 140. In step 450, the delay measurement unit 110 applies a tone communication to the voice input of the Internet telephone at terminal A 150 and measures the time (T1) that it takes to receive the tone back from the voice output of the POTS connection at terminal A 150. This measurement may be made by including a time stamp on the tone communication and determining the difference between the time stamp and the time of reception. This measurement may also be made by starting a timer when the tone communication is transmitted and stopping the timer when the tone communication is received. Any method useful for determining a time difference may be used in step 450.

In step 460, the delay measurement unit 110 feeds the voice output of the POTS connection at terminal B 140 to the voice input of the POTS connection at terminal B 140. In step 470, the delay measurement unit sends a tone from the terminal A 150 into the voice input of the POTS at terminal A 150 and measures the time (T2) that it takes to receive the tone back from the voice output of the POTS at terminal A 150. This measurement may be made in a similar manner to the measurement made at step 450. In step 480 the delay measurement unit calculates the Internet speech delay (T) from terminal A 150 to terminal B 140 according to T=T1−0.5(T2), for example. The value of the Internet speech delay (T) may then be output for the designer, may be used in a design of a network or voice over Internet system or may be output or used for any other appropriate reason. In step 490, the flowchart ends.

The method of this invention is preferably implemented on a programmed processor. However, delay measurement unit 110 may also be implemented on a general purpose or special purpose computer, a programmed microprocessor or microcontroller and peripheral integrated circuit elements, an ASIC or other integrated circuit, a hardware electronic or logic circuit such as a discrete element circuit, a programmable logic device such as a PLD, PLA, FPGA or PAL, or the like. In general, any device on which resides a finite state machine capable of implementing the flowcharts shown in the Figures may be used to implement the processor functions of this invention.

While this invention has been described with specific embodiments thereof, it is evident that many alternatives, modifications, and variations will be apparent to those skilled in the art. Accordingly, the preferred embodiments of the invention as set forth herein are intended to be illustrative, not limiting. Various changes may be made without departing from the spirit and scope of the invention.

What is claimed is:

1. A method of measuring delay over a network from a first terminal to a second terminal, comprising:

determining a first time difference based on a round-trip delay of a transmission over a first portion and a second portion of the network by
sending a first data transmission from the first terminal to the second terminal over the second portion of the network,
returning the first data transmission from the second terminal to the first terminal over the first portion of the network; and
determining the first time difference between sending and receiving the first data transmission at the first terminal;

determining a second time difference based on a round-trip delay of a transmission over the first portion of said network by
sending a second data transmission from the first terminal to the second terminal over the first portion of the network,
returning the second data transmission from the second terminal to the first terminal over the first portion of the network, and
determining the second time difference between sending and receiving the second data transmission at the first terminal; and calculating a delay value by subtracting half of the second time different from the first time difference.

2. The method of claim 1, wherein the second network portion includes a system and wherein the first network portion includes a service.

3. The method of claim 2, wherein the first data transmission includes a voice over Internet protocol data transmission and wherein the second data transmission includes a voice over Internet protocol data transmission.

4. The method of claim 1, wherein the returning of the first data transmission step returns the first data transmission in the form of a generated tone and wherein the second data transmission includes a generated tone.

5. An apparatus for establishing a communication connection comprising:

a database; and a controller connected with the database that determines a first time difference based on a round-trip delay of a transmission over a combination of a packetized network and a circuit-switched network by sending a first data transmission from the first terminal to the second terminal over the packetized network portion, returning the first data transmission from the second terminal to the first terminal over the circuit-switched network portion, and determining the first time difference between sending and receiving the first data transmission at the first terminal, determines a second time difference based on a round-trip delay of a transmission over the circuit-switched network portion by sending a second data transmission from the first terminal to the second terminal over the circuit-switched network portion, returning the second data transmission from the second terminal to the first terminal over the circuit-switched network, and determining the second time difference between sending and receiving the second data transmission at the first terminal, and calculates a delay value based on the two time differences by subtracting half of the second time difference from the first time difference.

6. The apparatus of claim 5, wherein the packetized network comprises an Internet system and wherein the circuit-switched network comprises a plain old telephone service.

7. The apparatus of claim 5, wherein the first data transmission includes a voice over Internet protocol data transmission and wherein the second data transmission includes a voice over Internet protocol data transmission.

8. The apparatus of claim 5, wherein the controller returns the first data transmission in the form of a generated tone and wherein the second data transmission includes a generated tone.

* * * * *